C. B. WEAVER.
SHEET METAL STAMPING DIE.
APPLICATION FILED FEB. 13, 1918.

1,408,787.

Patented Mar. 7, 1922.
6 SHEETS—SHEET 1.

Inventor
Clayton B. Weaver
by his atty. Samuel E. Darby

C. B. WEAVER.
SHEET METAL STAMPING DIE.
APPLICATION FILED FEB. 13, 1918.
1,408,787.  Patented Mar. 7, 1922.
6 SHEETS—SHEET 3.
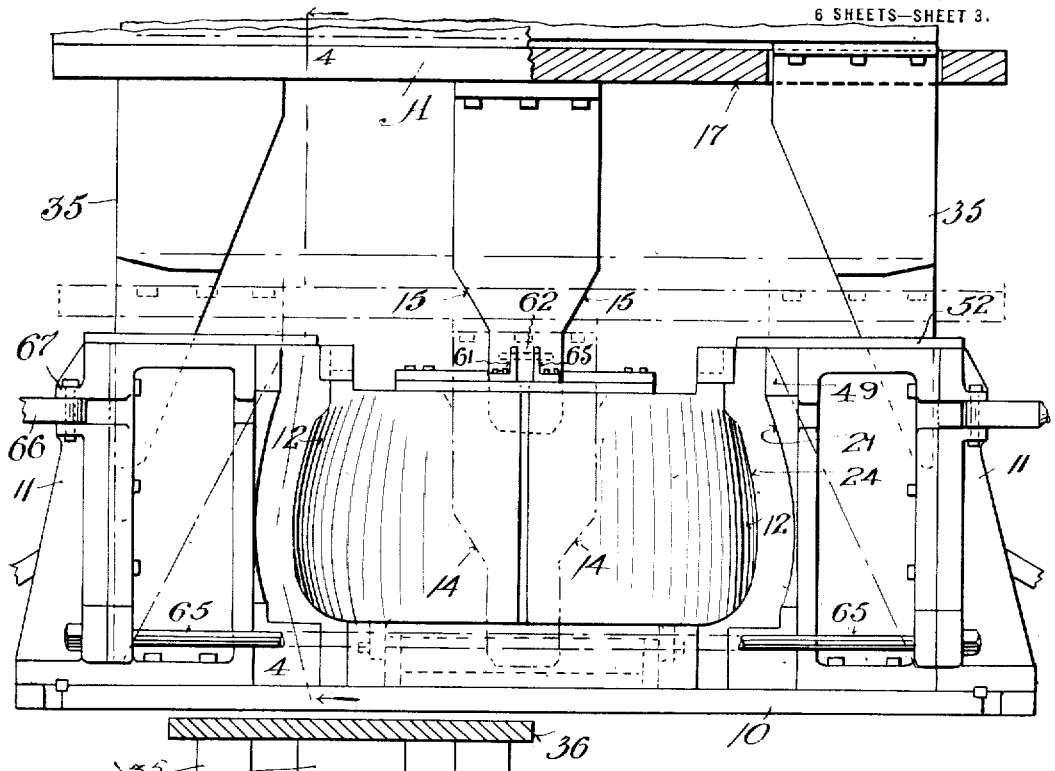
Fig. 3
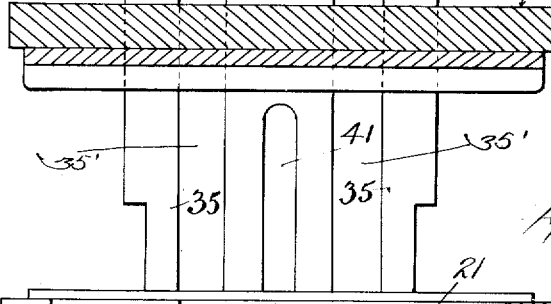
Fig. 4
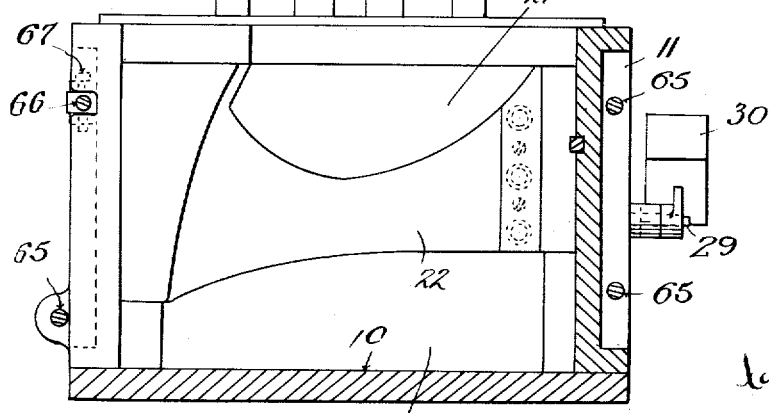
Inventor

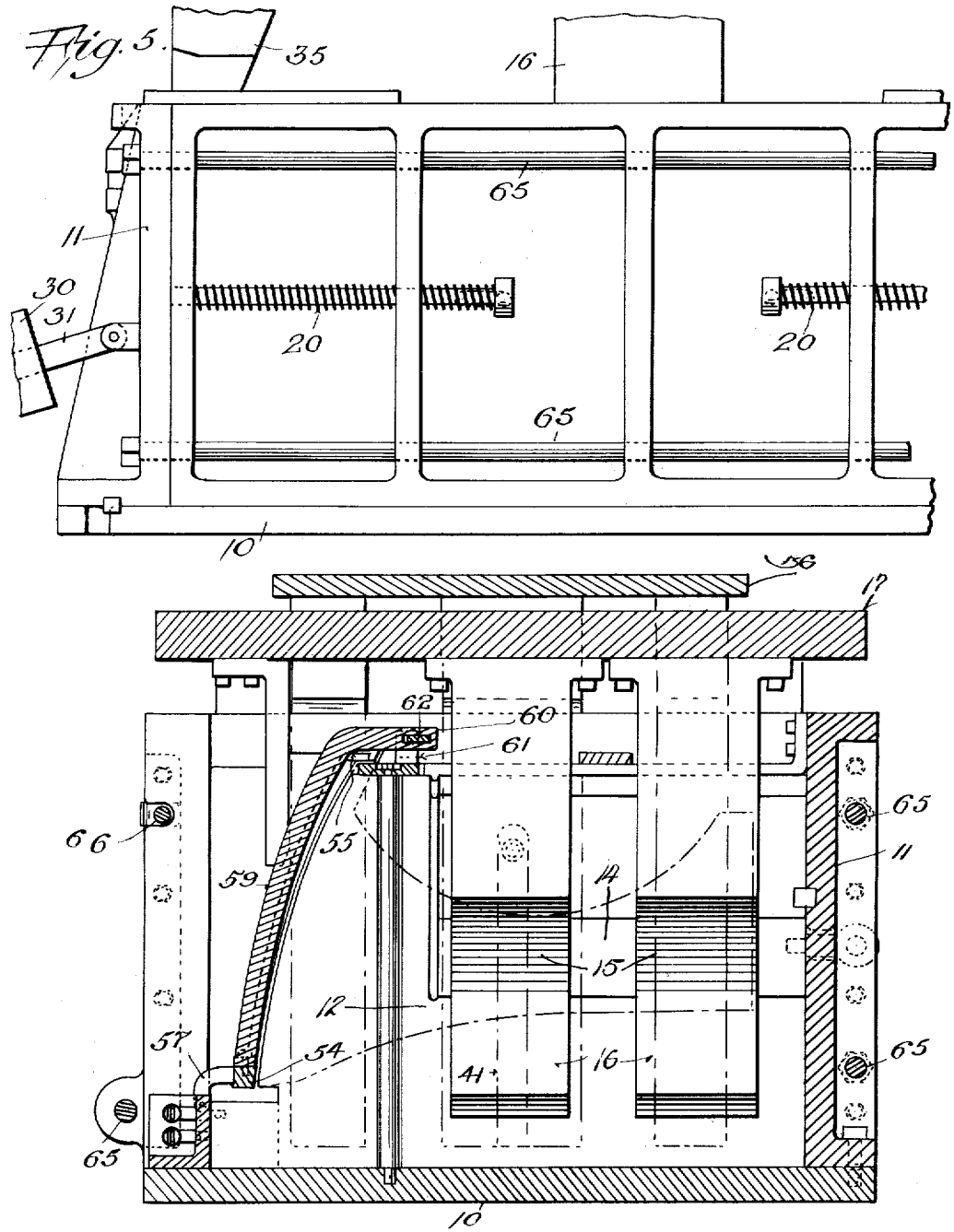

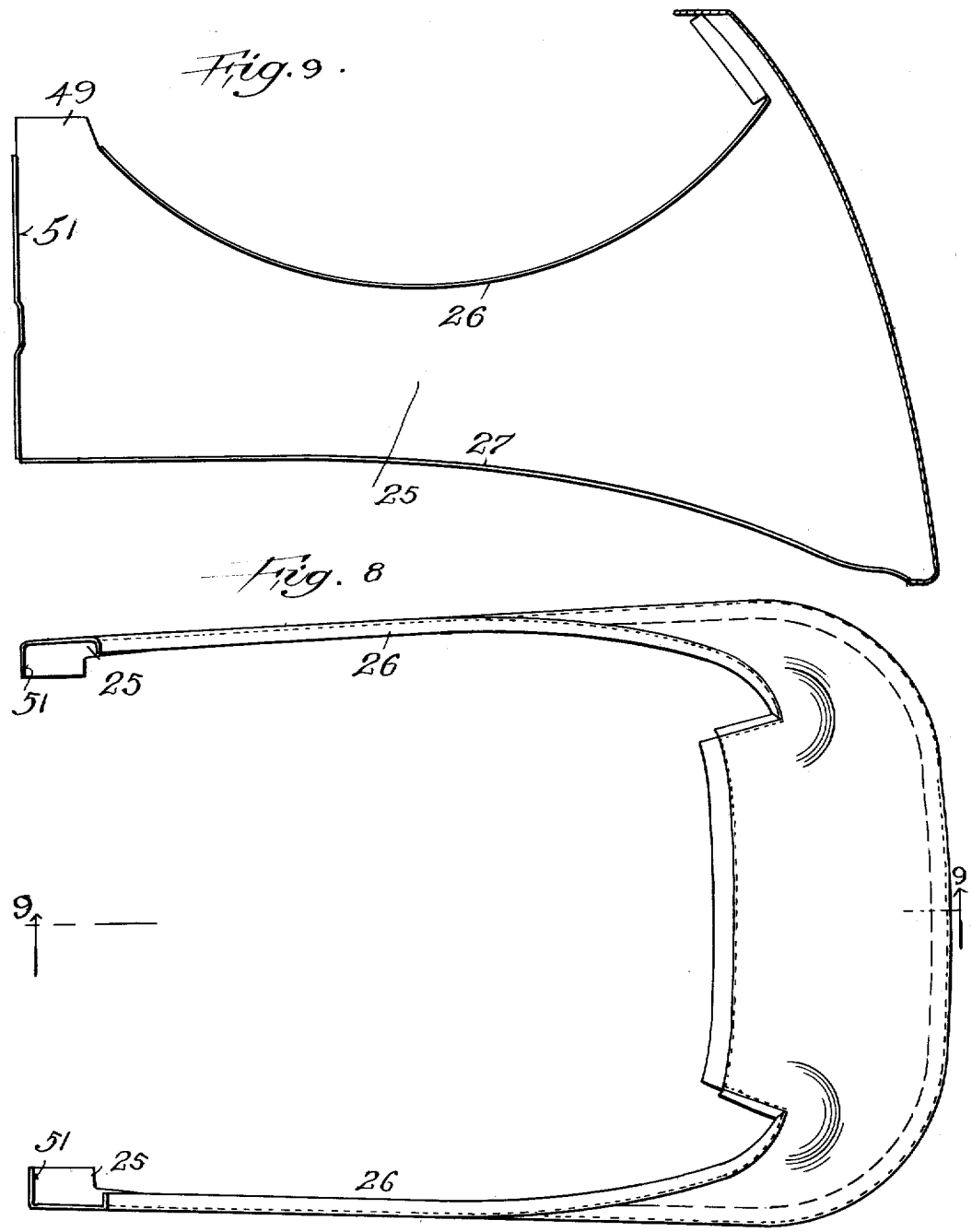

UNITED STATES PATENT OFFICE.

CLAYTON B. WEAVER, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

SHEET-METAL-STAMPING DIE.

1,408,787.	Specification of Letters Patent.	Patented Mar. 7, 1922.

Application filed February 13, 1918. Serial No. 216,946.

*To all whom it may concern:*

Be it known that I, CLAYTON B. WEAVER, a citizen of the United States, residing at Philadelphia, in the county of Philadelphia, State of Pennsylvania, have made a certain new and useful Invention in Sheet-Metal-Stamping Dies, of which the following is a specification.

This invention relates to sheet metal stamping dies, and particularly to dies for forming and flanging the sheet metal tonneau panel for an automobile body, provided with flanges for attaching the wheel housings.

The object of the invention is to provide a sheet metal stamping die structure which is simple, efficient, and automatic in operation, wherein the wheel housing flanges are formed in the tonneau of a sheet steel automobile body.

A further object of the invention is to provide a die structure for use in the manufacture of sheet steel automobile bodies which reduces the cost of manufacturing such bodies.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the accompanying drawings:—

Fig. 3 is a view in front elevation, parts broken out and parts in section, showing the die operating plungers in their raised positions.

Fig. 4 is a view in section on the line 4, 4, Fig. 3, looking in the direction of the arrows.

Fig. 5 is a broken view in rear elevation.

Fig. 6 is a view in vertical section on line 6—6 of Fig. 1 showing the plungers 16 in their lowered positions in elevation.

Fig. 8 is a view in top plan of a tonneau stamping produced in accordance with my invention.

Fig. 9 is a view in section on the line 9, 9, Fig. 8, looking in the direction of the arrows.

The same part is designated by the same reference numeral wherever it occurs throughout the several views.

In the manufacture of automobile bodies, and particularly bodies stamped out of sheet metal, it has heretofore been the practice to stamp the tonneau out of sheet steel and stamp the wheel housing out of a separate sheet of steel and to secure the same by spot welding, or otherwise, to the tonneau. This practice involves the formation of curved flanges on the sides of the tonneau panel to receive the edges of the wheel housings. It is among the special purposes of my invention to provide mechanism for forming the wheel housing flanges on the tonneau panel, which mechanism is also adapted to form the wheel housings integral with the tonneau panel, all in one operation, and from a single sheet of steel. I also propose simultaneously with the pressing of the tonneau into the required shape and the stamping of the wheel housing flanges therein to form the stamping with suitable edge flanges for securing the trimming or cushions employed in the finishing of the automobile body.

Figure 1:
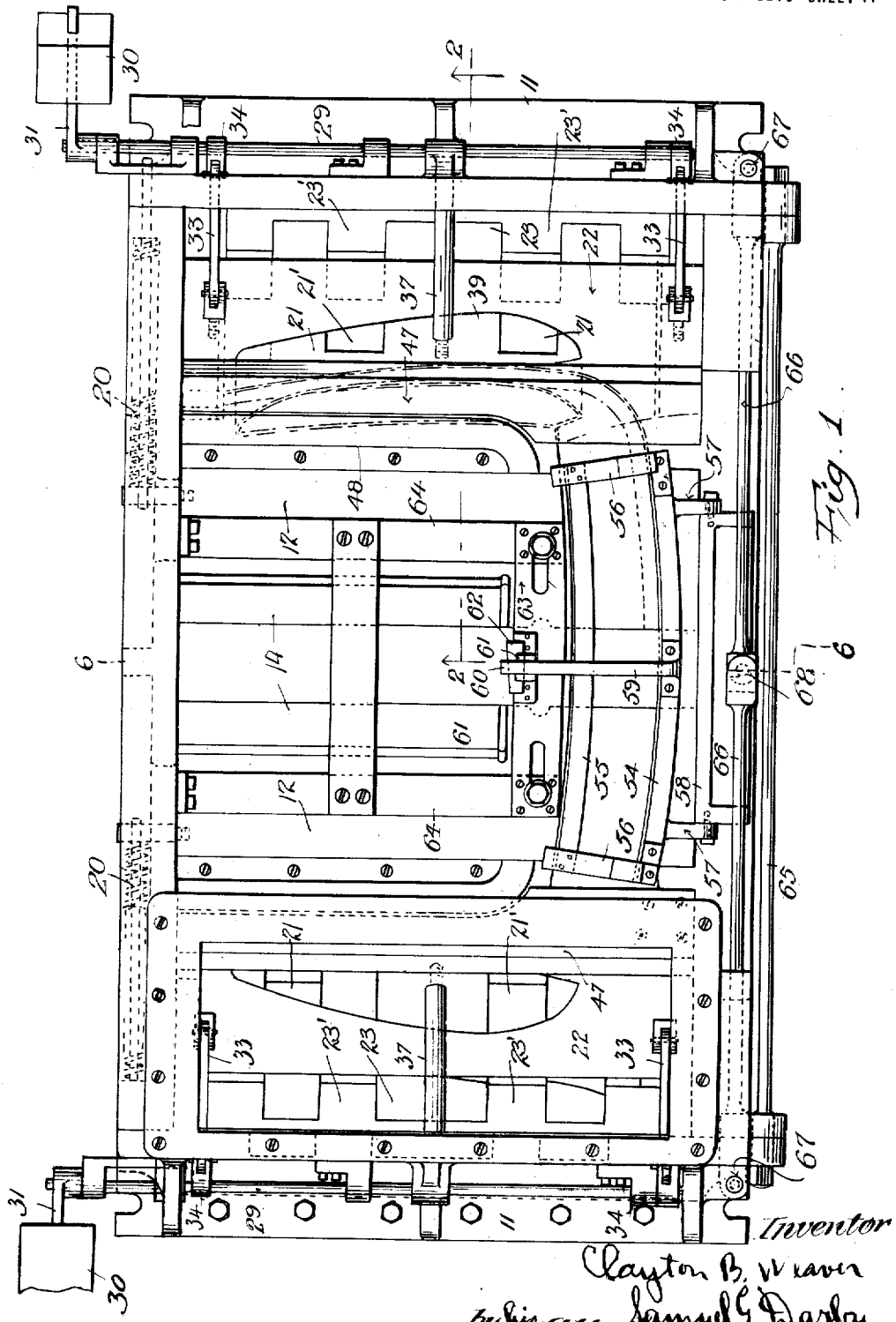
Fig. 1 is a view in top plan of a die structure embodying the principles of my invention.
Figure 2:
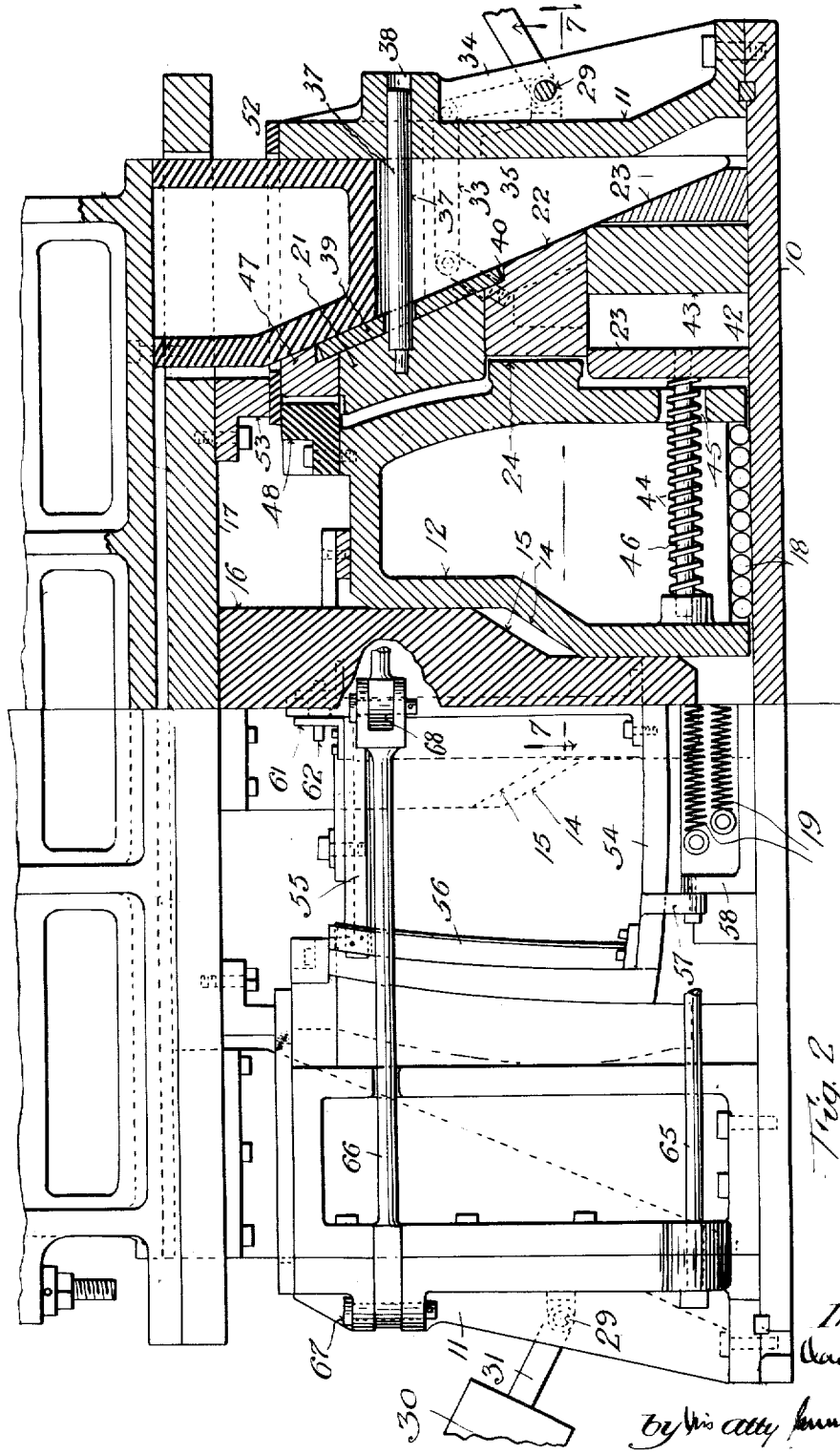
Fig. 2 is a view partly in front elevation and partly in section on the line 2, 2, Fig. 1, looking in the direction of the arrows, with the plungers in their lowered positions.
Figure 7:
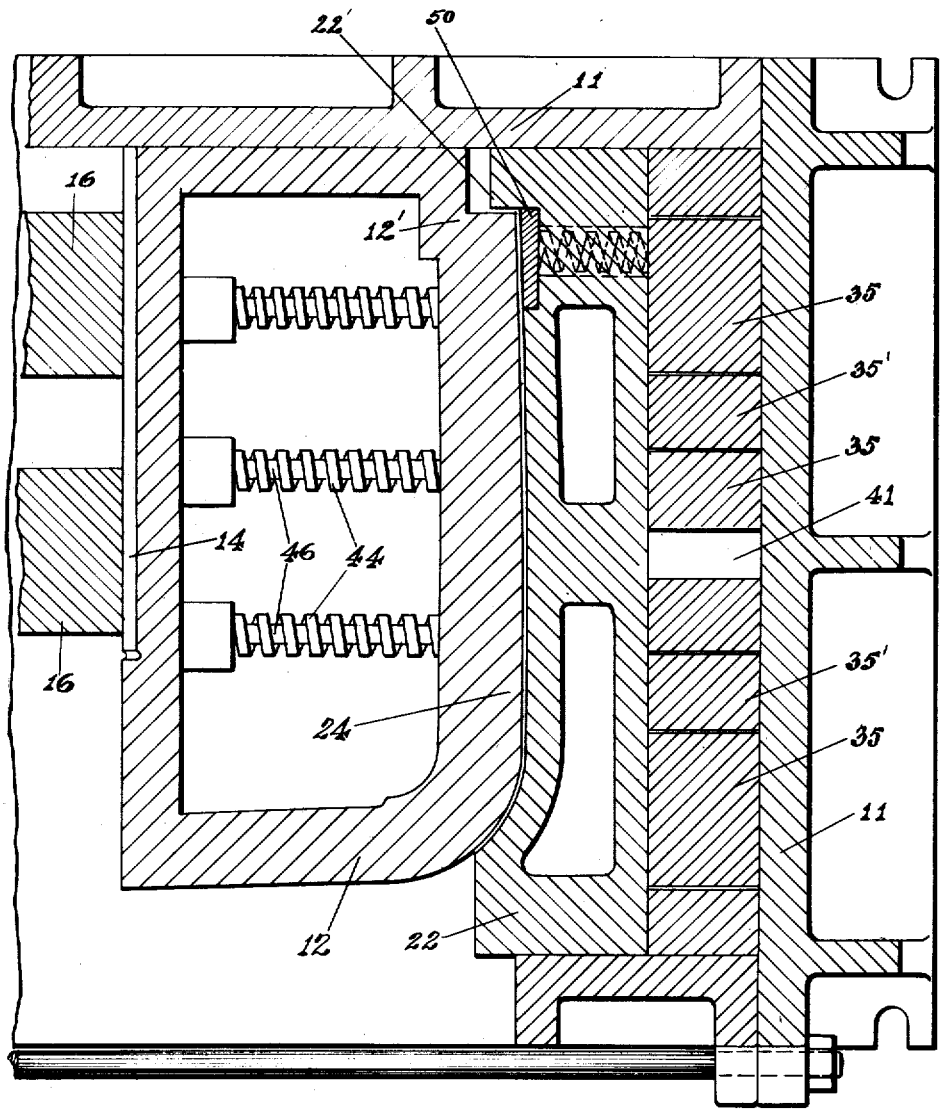
Fig. 7 is a broken view in horizontal section on the line 7, 7, Fig. 2.

In carrying out my invention I provide a suitable base plate 10 and framework 11, upon which the die structure is erected or assembled. Centrally within the framework are mounted a pair of die blocks 12 which are movable outwardly and apart or away from each other and form the inner blank holders. The die blocks 12 on their juxtaposed faces are provided with inclined surfaces 14, (see Fig. 2), with which cooperate corresponding inclined surfaces 15 on plungers 16 which are carried by a ram member 17 designed to be operated by hydraulic or other suitable form of power in such manner that as the ram member 17 descends the plungers 16, enter into the space between the die members or inner blank holders 12 and when the inclined surfaces 14, 15, engage each other the die blocks 12 are forced apart from each other. If desired, and in order to reduce friction, the die blocks 12 may be equipped with antifriction roller devices 18. The die blocks 12 are forced apart or away from each other by plungers 16 against the action of suitable tension devices, for example, pull springs 19, 20. These tension devices operate to draw the die blocks back towards the center and towards each other when the plungers are withdrawn from between said die blocks. The metal tonneau panel after being blanked and formed preliminarily to the desired contour is inserted and received in the die holder so as to lie around and against the outer surfaces of the inner blank holders or die blocks 12, these die blocks have each a projection or extension, 24, which is shaped to conform to the contour of the tonneau to be produced from the stamping. Opposed to the side surfaces of the inner blank holders or die blocks 12 are movable die members 21, 22, and 23. These movable die members are mounted to be moved or slid towards and from the opposed side surfaces of the inner blank holders or die blocks 12. The outer or side surfaces of the die blocks are provided with extensions or projections 24 over and upon which the sheet stamping is to be pressed to form the channel portion 25 of the finished product as shown in Figs. 8 and 9. The die blocks 21 and 23 co-operate with the upper and lower edges of the extensions 24 to form the flanges 26 and 27 in the stamping to be produced. The projection 24 is shaped on its upper edge to follow the contour of the wheel housing flange 26 in the longitudinal dimension thereof, and similarly the lower edge of the extension 24 of the die block 12 is shaped to conform to the longitudinal contour of the edge portion 27 of the stamping. The die block 22 which operates against the outer surface of the projection 24 of the inner blank holder or die block 12 is correspondingly shaped and forms the outer blank holder. This is yieldingly held in retracted position. This may be accomplished in any suitable or convenient manner. A simple and effective arrangement for this purpose is shown wherein I mount rock shafts 29 in the framework 11 on opposite sides of the machine. Counterweights 30 are mounted on crank arms 31 carried by these shafts tending to impart rotative tension to said shafts. The movable outer blank holders or die blocks 22 are connected to the shafts 29 through link and crank arm connections 33, 34, the arrangement being such that the tension of the counterweights is applied in the direction to withdraw the outer blank holder or die block 22 from the inner blank holder or die block 12. The outer blank holders or die blocks 22 are forced inwardly toward the inner blank holders in the operation of the apparatus by means of the inclined surfaces of wedge shaped plungers 35. The wedge-shaped plungers, 35', are carried by the ram member, 17, which carries the plungers, 16, so that both sets of plungers for operating the blank holders come down at the same time. In order that the plungers, 35', may actuate only the outer blank holders, 22, the outer faces of the die members, 21 and 23, are provided with grooves, 21', and 23', (see Fig. 1), in which the plungers, 35', work as they come down to force the outer blank holders towards the inner blank holders. Wedge-shaped plungers 35 are carried by a power driven ram member 36 which is operated in timely relation with respect to the ram member 17. The plungers 35 are located at opposite ends of the ram member 36 and engage the die members, 21 and 23, to force them towards the inner blank holders, 12. The movable die blocks 21 and 23, which cooperate with the extension, 24, on the side face of each inner blank holder or die block section 12 are disposed between said blank holders 12 and the plungers 35 carried by the corresponding end of the ram member 36, said plungers operating vertically inside the frame member 11 and between said frame member and the movable die blocks 21, 23, the inner edges or surfaces of the plungers 35 being inclined to engage and bear against the die members 21, 23, as the plungers 35 descend and force or press said die members towards the opposed side surface of the die block 12. The die block 21 is guided in its movements toward and from the juxtaposed surface of the inner blank holder or die block 12. This may be accomplished in any suitable or convenient manner. A simple arrangement is shown wherein a guide pin 37 is connected to the die block 21 and slides through an opening 38 in the frame side member 11. It will be understood that the outer blank holder 22 is forced by the plungers 35' towards the juxtaposed surface of the extension or projection 24 of inner blank holder 12 and against the tension of the counterweight 30 on shaft 29, so that when the plungers are retracted from their advanced or working positions the tension of said counterweight is exerted upon the outer blank holder 22 to withdraw the same laterally away from the surface of the inner blank holder 12 or the projection 24 thereof. In order to enable the withdrawing movement of the outer blank holder 22 to also effect a withdrawal of the die member 21 a keeper plate 39 is applied to the outer surface of the die member 21 through which keeper plate the guide pin 37 extends, the lower edge of which keeper plate projects beyond the lower edge of die member 21, and into a recess 40 formed in the outer blank holder 22. With this arrangement it will be understood that when the outer blank holder 22 is retracted from its working position under the influence of the counterweight 30 the extending edge of the keeper plate is engaged by said member 22 thereby also effecting the coincident withdrawal from working position of the die member 21. In order to accommodate the guide pin 37 the adjacent plunger 35 is vertically slotted as indicated at 41. In order to form the inturned flange 27 at the lower edge of the stamping the die member 23 is employed. The outer side surface of this die member is inclined to be engaged by the inclined surface of the plunger 35 to force said die member 23 inwardly towards the inner blank holder 12. The die member 23 is slotted as indicated at 42 to receive a supporting guide block 43 which helps to support the outer blank holder, 22. The movement inwardly of the die member 23 is against the action of a spring 44 interposed between said die member 23 and the inner blank holder 12. As shown the inner blank holder 12 is hollow and is formed with an opening 45 through its outer wall. A rod 46 is carried by the inner wall of the blank holder 12 and extends through the opening 45, and the die member 23 is loose upon the end of said rod, the spring 44 being coiled upon said rod and bearing at its ends respectively against the inner wall of blank holder 12 and the inner side surface of die member 23. When the plunger 35 is withdrawn from its working position the tension of spring 46 becomes effective to force the die member 23 outwardly from its working position. It will be observed that through the action of the die member 23 when advanced to its work the stamping is flanged over the lower edge of the extension or projection 24 of the blank holder 12. Positioned above the die member 21 is a member 47 which is fastened to and moves with blank holder, 22, and cooperates with a member 48 carried by inner blank holder 12 to clamp and hold therebetween the upper end portion 49 of the stamping. A floater 50 (see Fig. 7) which is spring-pressed, holds the end of the panel against the inner blank holder, 12. The projection, 22', on the outer blank holder, 22, cooperates with the shoulder, 12', on the inner blank holder, 12, to form the inturned flange 51 at the free edge of the stamping. A keeper plate 52 which is slotted to permit the passage therethrough of the plungers 35 and 35' serves to prevent movement of the die members a cross projection 53 carried by the ram 17 impinging upon said keeper plate to retain same in position.

The tonneau panel when applied around the blank holders 12 preparatory to being pressed into the desired form may be retained in position upon the blank holders in any suitable or convenient manner. A rocking or swinging gate is provided for this purpose. This gate includes the upper and lower members 54, 55, which extend lengthwise of the machine in front of the blank holders 12 and are connected together by the vertical members 56. The gate frame has hinge connections at its lower edge through arms 57 with a base support 58 upon which the gate may be rocked upon a horizontal axis at its lower edge outwardly or away from the blank holders 12 or inwardly towards said die blocks. The gate includes a member 59 which connects the upper and lower portions 54, 55, of the gate, and has its end 60 extending inwardly over the blank holders 12 when the gate occupies its closed position. The extending end 60 of this arm is received between lugs 61 and is retained in place when once positioned to close the gate by a wedge device 62. This affords a very simple, efficient and easily detachable arrangement for retaining the gate at closed position. The lugs 61 are carried by a bar 63 which is supported at its ends upon cross struts 64 of the main frame work.

The side members of the main frame at both front and rear are connected together by tie rods 65 to efficiently resist and take the strains of the die stamping operations. As an additional tying means the upper portions of the front edges of the machine frame side members are connected by detachable links or tie rods 66 which are pivoted at their extreme outer ends respectively as at 67 to the side members of the frame, and are hooked together at their inner ends when coupled up as indicated at 68.

It is believed that the construction and operation will be fully understood from the foregoing description taken in connection with the accompanying drawings. Briefly the operation is as follows:—A sheet steel panel formed preliminarily to the desired longitudinal contour is placed upon the inner blank holders 12. The gate member is then closed to retain the panel in position. The panel, of course, is bent upon practically its medial line, and the free end portions thereof are inserted in the spaces respectively at the sides of the inner blank holders 12 and between the latter and the outer blank holders, 47, and 22, and the die members 21, and 23. The ram is then operated to cause the plate, 17, carrying the plungers, 16 and 35', to descend. This forces the inner and outer blank holders, 12 and 22, towards each other so that they engage opposite side surfaces of the tonneau panel and clamp it in position. The same movement forms the flanges, 51, due to the cooperation of projections, 22', with shoulders, 12'. The ram member, 36, then descends carrying the wedge-shaped plungers, 35, which engage die members, 21, and 23, forcing them to the position shown in Fig. 2, so that the die member, 23, flanges the metal over the lower shoulder of projection, 24, forming flange, 27, of the panel, while die member, 21, flanges the metal over the upper shoulder of the projection, 24, forming the wheel housing flange, 26, on the panel. The ram member, 36, then moves up carrying plungers, 35, and then the ram member, 17, ascends, carrying the plungers, 16 and 35'. The advancement of the die member 23 to its work is against the tension of spring 44 and the advancement of the blank holder 22 is likewise against the tension of the counterweight 30, these tensions operating to withdraw these die members from applied position. As the blank holder 22 is withdrawn it effects the withdrawal of the die member 21 through the engagement of the lower edge of keeper plate 39 in the slot 40 of blank holder 22. When the plungers have attained their upper limit of movement of withdrawal the tie rods 66 are uncoupled from each other at 68 and swung out of the way, the retaining wedge 62 of the gate arm 60 is withdrawn, the gate is swung outwardly into open position and the completed stamping is removed ready to receive the next panel.

If desired, substantially this same mechanism may be used for flanging a tonneau panel, and, at the same operation, forming wheel house depressions in the sides of the panel. In that case, the wheel housing is formed by the cooperation of die member, 21, with the portion of inner blank holder, 12, above the projection, 24 and, in such case, the faces of the cooperating surfaces of blank holder, 12, and die member, 21, are formed to conform to the shape of the wheel housing and are brought into working relationship with each other.

While I have shown and described specific details of structure for carrying out the objects and purposes of my invention, I do not desire to be limited or restricted in the broadest scope of my invention to the axact details as shown, but having now set forth the objects and nature of my invention and a construction embodying the principles thereof and which I have found in practice to be efficient in the accomplishment of the desired object and purposes, what I claim as new and useful and of my own invention and desire to secure by Letters Patent is:—

1. In a machine of the class described, a base, a pair of blank holders each slidably mounted on said base, and one of them having a shoulder, and means for moving said blank holders toward each other to clamp the blank between them, in combination with a die member arranged to cooperate with the said shoulder to flange the blank thereover, and means to relatively move said die member and shouldered blank holder.

2. In a machine of the class described, a base, a pair of blank holders each slidably mounted on said base, and one of them having a shoulder, and means for moving said blank holders toward each other to clamp the blank between them, in combination with a die member arranged to cooperate with the said shoulder to flange the blank thereover, and means effective after the blank has been clamped between the blank holders for relatively moving said die member and shouldered blank holder.

3. In a machine of the class described, a base, a pair of blank holders each slidably mounted on said base, and one of them having shoulders, and means for moving said blank holders toward each other to clamp the blank between them, in combination with die members respectively disposed at opposite sides of one of said blank holders, and each cooperating with a shoulder on the other blank holder to flange the blank thereover, and means for relatively moving said die members and shouldered blank holder.

4. In a machine of the class described, the combination of a base, an inner blank holder slidably mounted on said base and provided with a die projection on its side face, a lower die member slidably mounted on said base, an outer blank holder slidably mounted above said lower die member and shaped to conform to the die projection on the inner blank holder, an upper die member slidably mounted above said outer blank holder, means for moving said blank holders toward each other to clamp the blank between them, and means for forcing said die members toward the inner blank holder to flange the clamped blank over the edges of said die projection.

5. In a machine of the class described, the combination of inner and outer blank holders movable toward each other, the inner blank holder formed with a shoulder, a ram member, plungers carried thereby and provided with cam surfaces engaging said inner and outer blank holders to force them toward each other to clamp the blank between them, a die member, and a plunger having a cam surface engaging said die member and forcing it toward the inner shouldered blank holder to flange the blank over the shoulder thereon.

6. In a machine of the class described, the combination of a base, an inner blank holder slidably mounted thereon and provided with a die projection on its side face, a lower die member slidably mounted on said base, an outer blank holder slidably mounted above said lower die member and shaped to conform to the die projection on the inner blank holder to clamp the blank thereagainst, an upper die member slidably mounted above said outer blank holder, a ram member, a plurality of plungers carried thereby and provided with opposed wedge surfaces engaging opposite faces of said blank holders to force them toward each other and clamp the blank between them, and a plunger having a wedge surface engaging said die members and forcing them toward the inner blank holder to flange the clamped blank over the edges of said die projection.

7. In a machine of the class described, the combination of a pair of inner blank holders, a pair of outer blank holders, the members of said pair of outer blank holders being respectively disposed at opposite sides of said pair of inner blank holders, one pair of said blank holders being shouldered, means for forcing said inner blank holders apart and said outer blank holders toward each other to clamp the blank, a pair of die members cooperating with said shouldered blank holders and means for forcing said die members toward said shouldered blank holders to flange the clamped blank over the shoulders formed thereon.

8. In a machine of the class described, the combination of a pair of inner blank holders having shoulders formed on their outer faces, a pair of outer blank holders between which said inner blank holders are positioned, means for forcing said inner blank holders away from each other and said outer blank holders toward each other to clamp the blank, a lower die member slidably mounted below each of said outer blank holders, an upper die member slidably mounted above each of said outer blank holders, and means for forcing said die members toward the inner shouldered blank holders to flange the clamped blank over the shoulders thereon.

9. In a machine of the class described, the combination of a pair of inner blank holders having shoulders on their outer faces, a pair of outer blank holders cooperating therewith, a ram member, a wedge plunger carried thereby and disposed between said inner blank holders, wedge plungers carried by said ram member and engaging said outer blank holders to force them toward said inner blank holders, a pair of die members, and means for forcing said die members toward said inner blank holders to flange the clamped blank over the shoulders thereon.

10. In a machine of the class described, the combination of a base, a pair of inner blank holders slidably mounted on said base and each provided with a die projection on its outer face, a pair of lower die members slidably mounted on said base on opposite sides of said inner blank holders, a pair of outer blank holders slidably mounted above said lower die members and shaped to conform to said die projections to clamp the blank thereagainst, a pair of upper die members slidably mounted above said outer blank holders, means for simultaneously forcing said inner blank holders away from each other and said outer blank holders toward each other to clamp the blank, and means for forcing said die members toward the inner blank holders to flange the blank over the edges of said die projections.

11. In a machine of the class described, the combination of a base, a pair of inner blank holders slidably mounted on said base and each provided with a die projection on its outer face, a pair of lower die members slidably mounted on said base on opposite sides of said blank holders, a pair of outer blank holders slidably mounted above said lower die members and shaped to conform to said die projections to clamp the blank thereagainst, a pair of upper die members slidably mounted above said outer blank holders, a ram member, a plunger carried thereby and extending between said inner blank holders, said plunger having wedge surfaces engaging the inner faces of said blank holders, a plurality of plungers carried by said ram member and having wedge surfaces engaging the outer faces of said outer blank holders, and a plurality of plungers having wedge surfaces engaging the outer faces of said die members.

12. In a machine of the character described, centrally disposed blank holders, each having a die projection on the exterior surface thereof and a cam projection on its inner surface, a plunger working between said blank holders and having cooperating cam surfaces on the sides thereof to engage the cam surfaces on the blank holders and force the latter apart, in combination with a plurality of die members positioned opposite and cooperating with the exterior die projection of each blank holder, wedge shaped plungers operating to engage said die members to force the same toward the blank holders, and means to yieldingly resist the action of said last named plungers.

13. In a machine of the class described, blank holders having die surfaces on the outer sides thereof, a plurality of cooperating die member positioned opposite the outer die surface of each of said blank holders, means for moving said die members and die surfaces relatively to each other to form the blank, and a retaining gate for retaining the blank in assembled position, said gate being shiftable from retaining to releasing position.

14. In a machine of the class described, blank holders having die surfaces cooperating with die members positioned opposite said die surfaces, and means for moving said members and die surfaces relatively to each other to form the blank, and a retaining gate for retaining the blank in assembled position, said gate being pivoted at its lower edge to be swung forwardly into retaining relation with respect to the blank holders, and means for detachably retaining the gate in its closed position.

15. In a machine of the class described, the combination of a framework including a base and side and rear walls, a plurality of die members movable laterally toward each other on said base, means for forcing said die members toward each other, and a gate removably closing the front of said framework.

16. In a machine of the class described, the combination of a framework including a base and side and rear walls, a plurality of die members movable laterally toward each other on said base, a plurality of plungers working through the top of said framework to force said die members toward each other, and a removable closure forming the front wall of said farmework.

17. In a machine of the class described, the combination of a framework including a base and side and rear walls, a plurality of die members movable laterally toward each other, a plurality of plungers working through the top of said framework and between the side walls and said die members to force the latter toward each other, and a removable closure for the front wall of said framework.

In testimony whereof I have hereunto set my hand on this 8th day of February, A. D. 1918.

CLAYTON B. WEAVER.

Certificate of Correction.

It is hereby certified that in Letters Patent No. 1,408,787, granted March 7, 1922, upon the application of Clayton B. Weaver, of Philadelphia, Pennsylvania, for an improvement in "Sheet-Metal-Stamping Dies," errors appear in the printed specification requiring correction as follows: Page 2, line 70, for the reference numeral "35" read *35'*; page 3, line 61, after the word "prevent" insert the word *upward;* and that the said Letters Patent should be read with these corrections therein that the same may conform to the record of the case in the Patent Office.

Signed and sealed this 17th day of April, A. D., 1922.

[SEAL.] KARL FENNING,

*Acting Commissioner of Patents.*